United States Patent [19]

Lindgren

[11] 4,160,521

[45] Jul. 10, 1979

[54] FIBRE-REINFORCED ROTOR

[75] Inventor: Mats Lindgren, Stockholm, Sweden

[73] Assignee: Fiber Mechanics AB, Stockholm, Sweden

[21] Appl. No.: 809,711

[22] Filed: Jun. 24, 1977

[30] Foreign Application Priority Data

Jul. 29, 1976 [SE] Sweden ............................... 7608542

[51] Int. Cl.² .............................................. B04B 1/00
[52] U.S. Cl. ................................................. 233/27
[58] Field of Search ............... 233/1 R, DIG. 1, 1 A, 233/1 E, 11, 27, 28; 74/572; 57/76

[56] References Cited

U.S. PATENT DOCUMENTS

| | | | |
|---|---|---|---|
| 618,196 | 1/1899 | Ashworth et al. | 233/27 X |
| 3,797,737 | 3/1974 | Kadotani et al. | 233/27 |
| 3,823,869 | 7/1974 | Loison | 233/27 X |
| 3,854,657 | 12/1974 | Pause | 233/47 R |
| 3,913,828 | 10/1975 | Roy | 233/27 |
| 3,986,663 | 10/1976 | Jonsson | 233/20 A |
| 4,054,243 | 10/1977 | Ivanovich et al. | 233/26 |

FOREIGN PATENT DOCUMENTS

| | | | |
|---|---|---|---|
| 2251373 | 4/1973 | Fed. Rep. of Germany | 233/27 |
| 7015585 | 5/1971 | Netherlands | 233/27 |
| 984340 | 2/1965 | United Kingdom | 64/15 |

Primary Examiner—George H. Krizmanich
Attorney, Agent, or Firm—Frishauf, Holtz, Goodman and Woodward

[57] ABSTRACT

A rotor having an external fibre-reinforced ring or sleeve positioned coaxially about an internal rotor member. The internal rotor member has a frusto-conical outer surface and the fibre-reinforced sleeve is arranged on the outer surface of an internally frusto-conical intermediate sleeve, the conicity of which corresponds to the conicity of the internal rotor member. The intermediate sleeve with the external fibre-reinforced sleeve is pressed on the internal rotor member in the axial direction.

12 Claims, 3 Drawing Figures

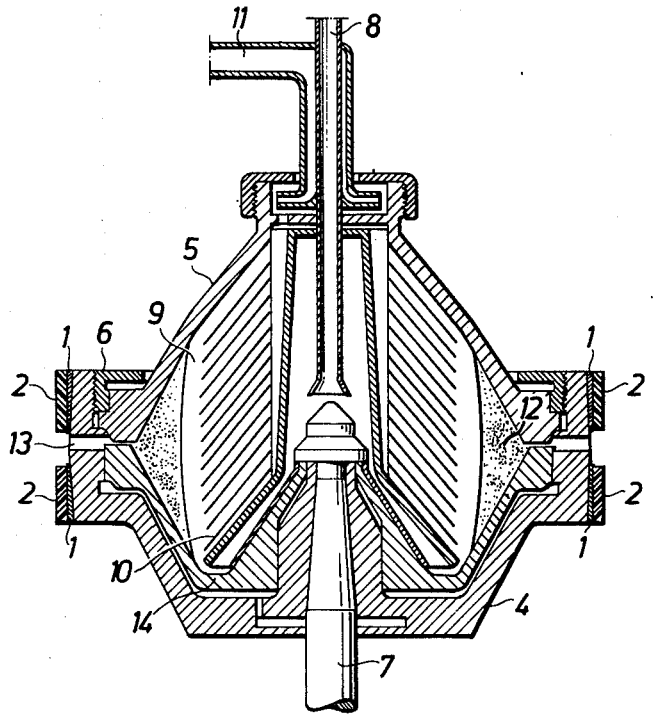

FIBRE-REINFORCED ROTOR

This invention relates to fibre-reinforced bodies intended to rotate at high speeds, such as parts of centrifugal separators and generators, impellers, flywheels and the like, which hereinafter and in the claims for reason of simplicity are called rotors. The invention also relates to a method of manufacturing such a rotor and to a device for use when carrying out the method of manufacture.

The requirements with respect to the speed and diameter of modern rotors, for example for centrifugal separators, have implied a close approach to the limit of steel material concerning its resistance to stresses caused by the rotation speed. As the stress in the material is proportional to the density and to the square of the rotation speed, the strength properties cannot appreciably be improved by increasing the material thickness, as thereby also the circumferential speed increases.

One way of coping with the increasing stresses is to utilize a material having a lower density than steel because according to the above, the stress in the material is proportional to the density. One such material which combines the advantages of high tensile strength and low density is fibre-reinforced plastic, so-called fibre-laminate. The properties of carbon fibres have proved to be especially advantageous. For practical reasons, however, the entire rotors cannot be made of fibre-laminate. Instead, the fibre-laminate is applied in the form of an external member or a sleeve, preferably pre-stressed, which is positioned about an internal rotor member, usually made of steel.

Several methods of applying such fibre-laminate members on rotors are previously known. One such method is described in Swedish Pat. No. 7011769 and makes use of a so called "shrinkage fit", wherein the internal metallic rotor member is kept at a low temperature while the external fibre-laminate member in the form of a sleeve is applied to the metal member. When the temperature of the metal member rises at room temperature a surface pressure beween the members is obtained. However, due to the limited temperature reduction obtainable, any high surface pressure cannot be achieved in this way. Said method is also mentioned in German Disclosure document DT-OS 05 22 41 119 which further discloses a method according to which the members are manufactured with a very small, accurately determined dimensional difference so that a certain, relatively low surface pressure is obtained immediately when the members are pressed together.

In another method, disclosed in Swedish published application No. 74 01029-9 the fibre is wound with a certain tensile stress directly on the metallic rotor member. However, this method also does not render possible any high pre-stress because the fibre readily breaks in connection with the winding. A further method known through Swiss Pat. No. 499732 is to press together the external and internal members and then to rotate the rotor at such a speed that the internal metallic member is plastically deformed. Thereby, a certain surface pressure is obtained between the members. This method, however, is not suitable for certain metallic materials, and it also brings about a relatively limited surface pressure. Most of the known methods mentioned above, moreover, are relatively inconvenient to apply in practice as they among other things do not permit an easy exchange of an external laminate member in the field.

It also has been proposed previously to design an ultra-centrifuge in the form of a relatively thin internal metal sleeve surrounded by a number of fibre-laminate rings; see German Disclosure document DT-OS 21 44 739. In said last mentioned German Disclosure document it is mentioned that said laminate rings can be fixed to the metal sleeve by means of a shrinkage fit or by making use of conical surfaces. The laminate rings, however, are not intended to bring about any pre-stressing of the internal, relatively thin and weak metal sleeve the primary object of which is to prevent the centrifuged gas from attacking the fibre-laminate.

The known art of utilizing frusto-conical surfaces for the fixing of fibre-laminate rings directly on the outer surface of a frusto-conical metal rotor suffers among other things from the two following disadvantages. Firstly, crack formations can arise at the inner conical surface of the laminate as a result of contact with the internal metal member during the pressing-on operation. This risk as well as practical problems in connection with the pressing-on operation proper should imply that said technique cannot be applied for obtaining any high surface pressure. Secondly, the use of frusto-conical laminate members and an internal metal member having a corresponding conicity results in different deformation conditions along the rotor, because the different types of material with different densities will not have a constant thickness along the rotor.

It is a main object of the present invention to provide a fibre reinforced rotor and a method of manufacturing such a rotor by utilizing frusto-conically coacting surfaces in such a way that the above mentioned disadvantages and risks are eliminated.

As according to the invention the disadvantages in connection with the use of coacting frusto-conical surfaces are avoided it is possible to fully utilize the advantages of said technique, implying among other things that in a very simple and reproducible manner pre-stresses can be obtained which are substantially higher than heretofore obtainable.

SUMMARY OF THE INVENTION

According to the present invention, at least one external fibre-reinforced ring or sleeve is attached to the outer surface of an internally frusto-conical intermediate sleeve, the conicity of which sleeve corresponds to the conicity of an internal rotor member. By a suitable choice of the material of the intermediate sleeve in relation to the material of the internal rotor member the intermediate sleeve with the external fibre-reinforced sleeve can be pressed on the internal member with great force so as to obtain high pre-stressing surface pressures without giving rise to problems either at the contact surface between the internal rotor member and the intermediate sleeve or between said sleeve and the external sleeve.

By making the intermediate sleeve of a material having substantially the same density as the material of the internal rotor member, also the above mentioned problems arising from different deformation conditions along the rotor can be eliminated.

DETAILED DESCRIPTION

Figure 1:
FIG. 1 is a schematic view of a fibre-reinforced external sleeve supported by an intermediate sleeve.

The composite sleeve according to FIG. 1 intended to pre-stress an internal rotor member comprises a thin intermediate sleeve 1 with a substantially cylindrical outer surface and a frusto-conical inner surface. The conicity of the inner surface corresponds to the conicity of the rotor member to which the composite pre-stressing sleeve is to be attached and the material of the intermediate sleeve 1 preferably has substantially the same density as the material of said rotor member. On the cylindrical outer surface of the sleeve 1 a fibre-laminate sleeve member 2 of substantially uniform thickness is attached.

The laminate member 2 can be attached to the sleeve 1 by any known method, such as direct winding on the sleeve, as said member is only to be fixed to the sleeve 1 without pre-stressing. Preferably the fibre-laminate member 2 comprises plastic and carbon fibres, but it also may comprise other fibre-laminates having a high tensile strength.

Figure 2:
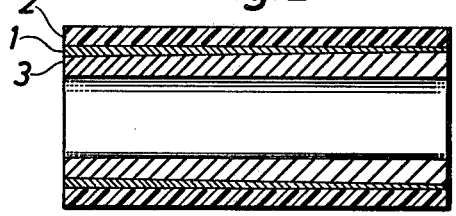
FIG. 2 is a schematic view of a rotor enforced or strengthened by means of a fibre-reinforced sleeve manufactured by the method according to the invention.

In FIG. 2 a fibre-laminate reinforced rotor manufactured according to the invention is shown which comprises an internal rotor member 3 of metal, for example stainless steel, the outer surface of which has a certain frusto-conicity, for example 1:20. To the internal member 3 a pre-stressing composite sleeve according to FIG. 1 is attached, the thin intermediate sleeve 1 having a frusto-conicity corresponding to that of the internal member 3. The material of the intermediate sleeve 1 is so selected in relation to the metal member that no problems arise when the composite sleeve is being pressed upon the internal member 3. Thus, very high surface pressures for pre-stressing the rotor can be obtained by the invention by a very simple pressing-on operation, which pressures substantially exceed the pressures obtainable by the prior art methods referred to above. In most cases the combined sleeve has to be pressed on a distance corresponding to some millimeters only depending on the selected conicity.

Due to the pre-stressing of the internal rotor member 3 the surface pressure acting thereon results in a negative tangential component, i.e. the diameter of the internal rotor member is decreased slightly owing to said surface pressure. At the same time the external member of the fibre-laminate is given a pre-stressing with a positive tangential component. The dimensions of the members and the actual surface pressure between the same are to be chosen so that both the internal member 3 and the external fibre-laminate member 2 at the speed of operation of the rotor are given effective stresses of an acceptable level, i.e. sufficiently far below the critical stress level of the material in question. A rotor reinforced according to the invention can be operated at a higher rotation speed than a corresponding rotor made of metallic material only without the risk of deformation or breakage being increased.

The utilization of an intermediate sleeve 1 according to the invention involves great advantages even when no use is made of the pre-stressing possibility according to above. If the intermediate sleeve 1 is made of the same material or of a material having substantially the same density as the material of the internal rotor member 3 among other things improved deformation conditions and other practical advantages are obtained, as already mentioned, due to the fact that the different material types of different densities will have a constant thickness along the length of the rotor.

Figure 3:
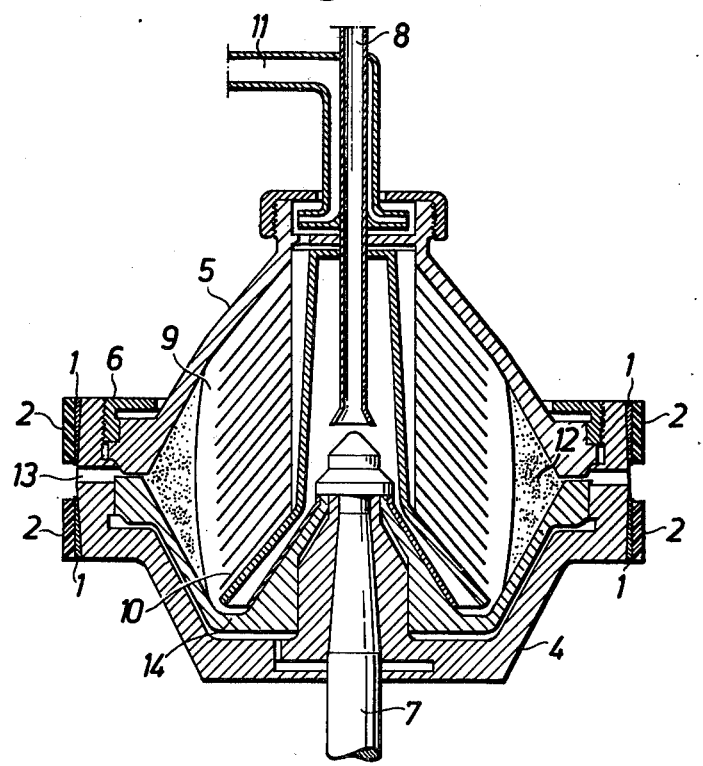
FIG. 3 illustrates the application of the invention in connection with a centrifugal separator.

In FIG. 3 the invention is shown as applied to the rotor of a prior art centrifugal separator. The centrifuge rotor of FIG. 3 may be of the kind described in the U.S. Pat. No. 3,986,663. The rotor comprises a lower part 4 and an upper part 5, which parts are held together by means of a lock ring 6. The rotor is supported and driven by a shaft 7. The reference number 8 designates a stationary inlet conduit through which the mixture of media to be separated is supplied to the separating chamber 9. During the separating operation a light component of the mixture flows radially inwards between the discs in a disc set 10 and then through an output conduit 11. Separated heavy component of the mixture remains in the separating chamber 9 and forms a gradually growing layer 12 in the radially outer part thereof.

The lower part 4 of the rotor has a number of openings 13 around its periphery which normally are closed by a valve member 14 axially movable within the centrifuge rotor. When a certain quantity of heavy component has been separated in the centrifuge rotor the outlet openings 13 may be uncovered by moving the member 14 axially downwards so that part of the rotor content is thrown out through the openings 13. The operation of the centrifuge rotor of FIG. 3 is disclosed in greater detail in the above mentioned U.S. Pat. No. 3,986,663.

The rotor of FIG. 3 has been strengthened by means of two combined sleeves according to FIG. 1, each comprising a thin internally frusto-conical sleeve 1 and a surrounding fibre-reinforced external sleeve 2. Said combined sleeves are positioned coaxially about slightly conical portions of the lower rotor part 4. Preferably, the internal sleeves 1 which are very thin are made of a material having a pronounced yield point. The outer sleeves 2 are preferably manufactured in the form of a laminate of a curable resin, for instance epoxy resin, and carbon fibres. Other fibres, for instance glass fibres, may also be used. Further, the plastic material may be replaced by another lightweight material, such as aluminium.

Tests have been carried out using a conicity of 1:20. However, in order to reduce the amount of material to be removed from the rotor to obtain the desired frusto-conicity a much more gentle frusto-conicity may be preferred, for instance 1:100. Good results have been obtained using a surface pressure between the pre-stressing sleeve combination and the rotor which at idle rotor is of the order of 1 kp/cm$^2$.

The results show that by using a fibre-reinforcement according to the invention it is relatively easy to increase the maximum rotational speed of a rotor by 20–25% which corresponds to an increase in the separating effect of the order of 40–50%. This results in that many separating operations can be accelerated and/or made more efficient and renders possible new applications of the separating technique.

What is claimed is:
1. A fibre-reinforced rotor comprising:
   an internal rotor member (3) having a substantially smooth frusto-conical outer surface;
   an internally frusto-conical intermediate sleeve (1) positioned on said frusto-conical outer surface of said internal rotor member (3), the frusto-conicity of said intermediate sleeve (1) being substantially smooth and corresponding to the frusto-conicity of said internal rotor member (3); and an external fibre-reinforced member (2) positioned coaxially about the outer surface of said intermediate sleeve (1);

said intermediate sleeve (1) with said external fibre-reinforced member (2) being slidably attached over said internal rotor member (3) with a press fit therebetween to pre-stress said internal rotor member (3) due to the press fit.

2. A rotor according to claim 1, wherein said intermediate sleeve with said external fibre-reinforced member is pressed on said internal rotor member, so that a high pre-stressing surface pressure exists between the different members.

3. A rotor according to claim 1, wherein said fibre-reinforced member is a laminate of plastic and carbon fibres.

4. A rotor according to claim 1, wherein said intermediate sleeve is made of a material having a pronounced yield point.

5. A rotor according to claim 1, wherein said intermediate sleeve is made of a material having substantially the same density as the material of said internal rotor member.

6. A rotor according to claim 1 wherein both the thickness of said fibre-reinforced member and the total of the material thicknesses of said internal rotor member and intermediate sleeve are substantially constant along the length of the rotor.

7. A centrifugal separator, comprising a rotor according to claim 1, said rotor having an inner separating chamber; means for rotatably supporting and rotatably driving said rotor; inlet means for supplying material to be separated to said rotor separating chamber; and outlet means coupled to said rotor separating chamber for removing separated components of said material from said rotor separating chamber.

8. A centrifugal separator according to claim 7 wherein said outlet means comprises a number of outlet openings around the periphery of said internal rotor member, and wherein said fibre-reinforced sleeve arranged on said intermediate sleeve is attached to said internal rotor member at each side of said openings.

9. A rotor according to claim 1, wherein said intermediate sleeve is frictionally press-fittingly slid over said internal rotor member over a longitudinal portion of said frusto-conical outer surface of said internal rotor member which is substantially shorter than the length thereof.

10. A rotor according to claim 1, wherein said external fibre-reinforced member (2) comprises a laminate of plastic and carbon fibres; and wherein said internally frusto-conical sleeve (1) is made of a material having a pronounced yield point.

11. A rotor according to claim 1, wherein said fibre-reinforced member is a sleeve.

12. A rotor according to claim 1, wherein said fibre-reinforced member is a ring.

* * * * *